US010411339B2

(12) United States Patent
Cashion et al.

(10) Patent No.: US 10,411,339 B2
(45) Date of Patent: Sep. 10, 2019

(54) POSITION ADJUSTER FOR MILLIMETER WAVE ANTENNA

(71) Applicant: E-BAND COMMUNICATIONS, LLC, San Diego, CA (US)

(72) Inventors: Steven Andrew Cashion, San Diego, CA (US); Jimmy Hannan, San Diego, CA (US)

(73) Assignee: E-BAND COMMUNICATIONS, LLC, San Diego, CA (US)

(*) Notice: Subject to any disclaimer, the term of this patent is extended or adjusted under 35 U.S.C. 154(b) by 482 days.

(21) Appl. No.: 14/811,071

(22) Filed: Jul. 28, 2015

(65) Prior Publication Data

US 2016/0036123 A1 Feb. 4, 2016

Related U.S. Application Data

(60) Provisional application No. 62/031,022, filed on Jul. 30, 2014.

(51) Int. Cl.
*H01Q 3/08* (2006.01)
*F16B 39/12* (2006.01)
*H01Q 1/12* (2006.01)

(52) U.S. Cl.
CPC ............ *H01Q 3/08* (2013.01); *F16B 39/12* (2013.01); *H01Q 1/1228* (2013.01)

(58) Field of Classification Search
CPC ............ H01Q 1/12; H01Q 1/25; H01Q 1/228; H01Q 3/02; H01Q 3/08; A47B 96/06; A47G 29/00; A47K 1/00; E04G 3/00; E04G 5/06; F21V 21/00; F21V 35/00; F16B 39/12; F16B 39/36; Y10S 411/931

USPC .......... 411/222, 226, 427; 248/205.1, 218.4, 248/222.51, 122.1, 371, 372.1, 419, 248/284.1, 291.1, 292.11, 292.13, 214; 343/878, 880, 882, 890, 892, 765, 757

See application file for complete search history.

(56) References Cited

U.S. PATENT DOCUMENTS

| 327,612 | A | * | 10/1885 | Stark | F16B 37/041 403/21 |
| 579,848 | A | * | 3/1897 | Thompson | F16B 39/12 16/DIG. 37 |
| 2,051,066 | A | * | 8/1936 | Anderson | F16B 29/00 24/689 |

(Continued)

*Primary Examiner* — Nkeisha Smith
(74) *Attorney, Agent, or Firm* — Mintz Levin Cohn Ferris Glovsky and Popeo, P.C.

(57) ABSTRACT

An adjustor configured to position an antenna coupled to a mounting element includes an adjustor nut having a bore extending along a longitudinal axis of the adjustor nut. At least a portion of the bore has inner threads configured to engage corresponding threads on a first portion of the mounting element positioned within the bore. A tool interface is positioned near a proximal end region of the adjustor nut and an external fastening mechanism positioned near a distal end region of the adjustor nut. A preload nut configured to engage the external fastening mechanism and configured to apply a load onto a second portion of the mounting element is positioned between a portion of the adjustor nut and the preload nut. Rotation of the adjustor nut around the longitudinal axis causes movement of the first portion along the longitudinal axis while the load is applied onto the second portion.

14 Claims, 15 Drawing Sheets

(56) References Cited

U.S. PATENT DOCUMENTS

| | | | | |
|---|---|---|---|---|
| 4,043,239 A | * | 8/1977 | DeFusco | F16B 5/0233 |
| | | | | 296/187.01 |
| 4,165,904 A | * | 8/1979 | Reppert | B60B 3/14 |
| | | | | 301/35.629 |
| 4,295,765 A | * | 10/1981 | Burke | B60P 7/0807 |
| | | | | 296/167 |
| 5,492,388 A | * | 2/1996 | Kawasaki | B62D 25/147 |
| | | | | 296/193.02 |
| 6,407,713 B1 | * | 6/2002 | Mallenius | F16M 11/10 |
| | | | | 343/765 |
| 6,664,937 B2 | * | 12/2003 | Vermette | H01Q 1/1228 |
| | | | | 248/278.1 |
| 6,896,462 B2 | * | 5/2005 | Stevenson | F16B 13/002 |
| | | | | 411/1 |
| 6,991,414 B1 | * | 1/2006 | Mensah | F16B 37/145 |
| | | | | 411/231 |
| 7,819,613 B2 | * | 10/2010 | Strom | B23P 6/00 |
| | | | | 411/178 |
| 8,020,824 B2 | * | 9/2011 | Pan | F16M 11/10 |
| | | | | 248/222.51 |
| 8,866,695 B2 | * | 10/2014 | Renilson | H01Q 1/1228 |
| | | | | 248/218.4 |
| 9,478,845 B2 | * | 10/2016 | Hemmervall | F16B 5/0233 |
| 2005/0058521 A1 | * | 3/2005 | Stevenson | F16B 13/002 |
| | | | | 411/82 |
| 2016/0294036 A1 | * | 10/2016 | Christie | F16M 13/022 |

\* cited by examiner

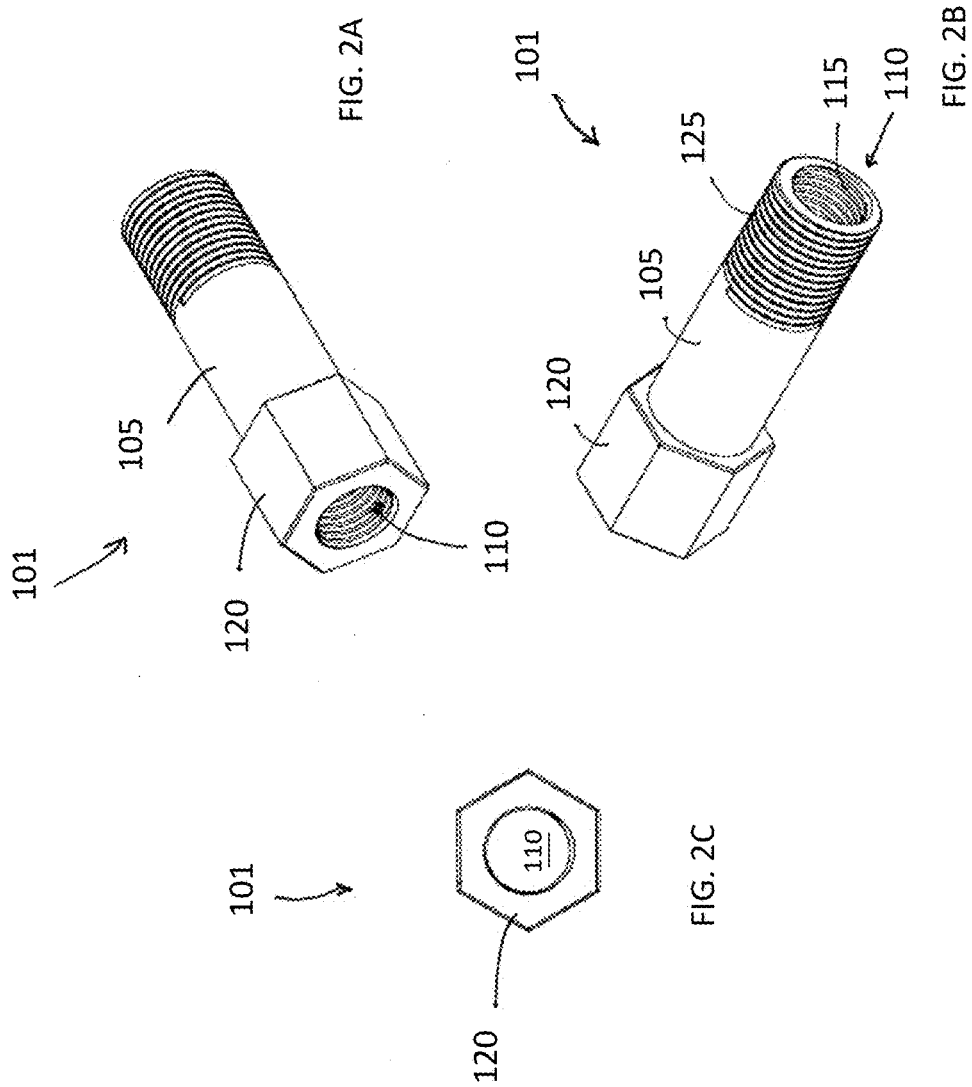

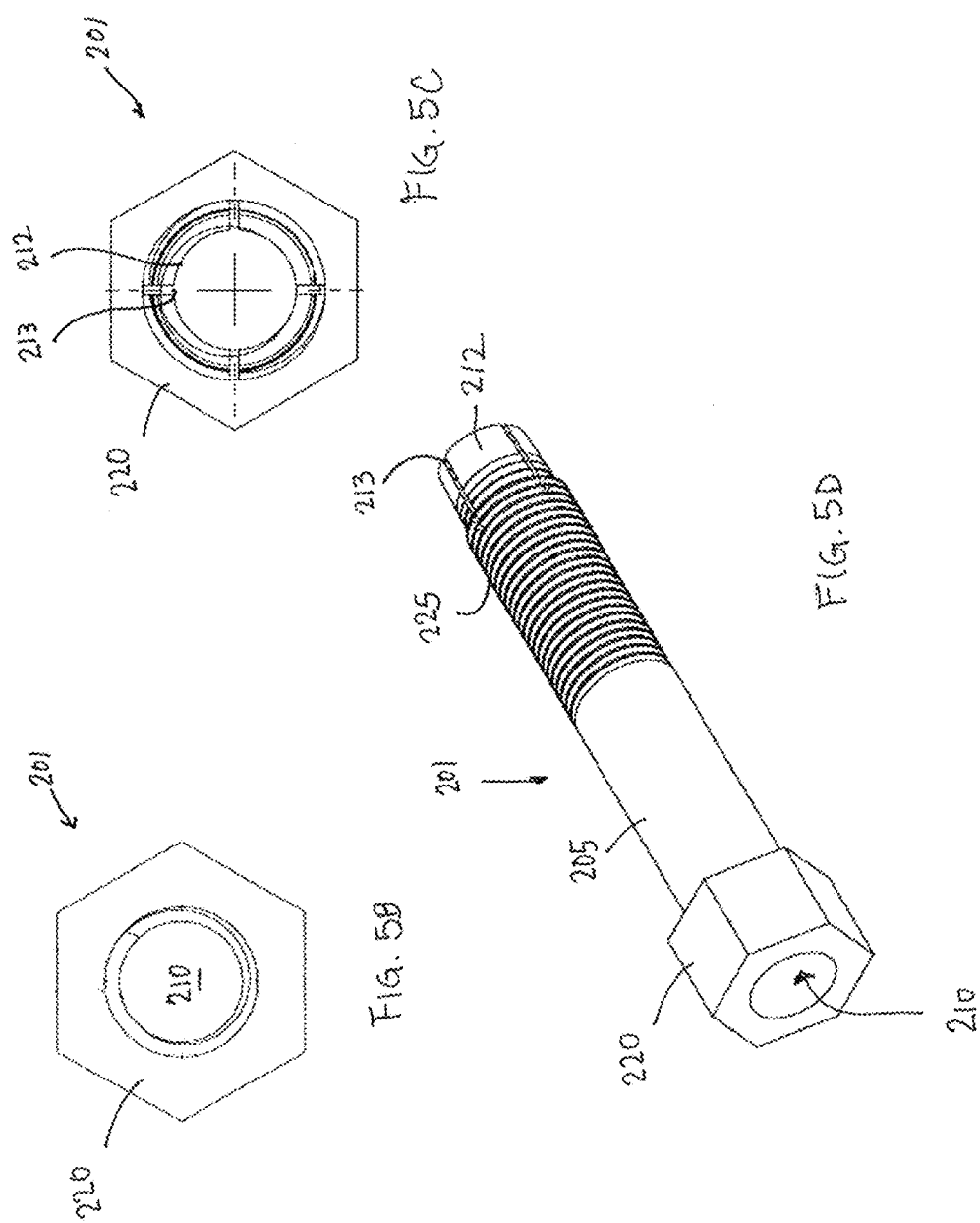

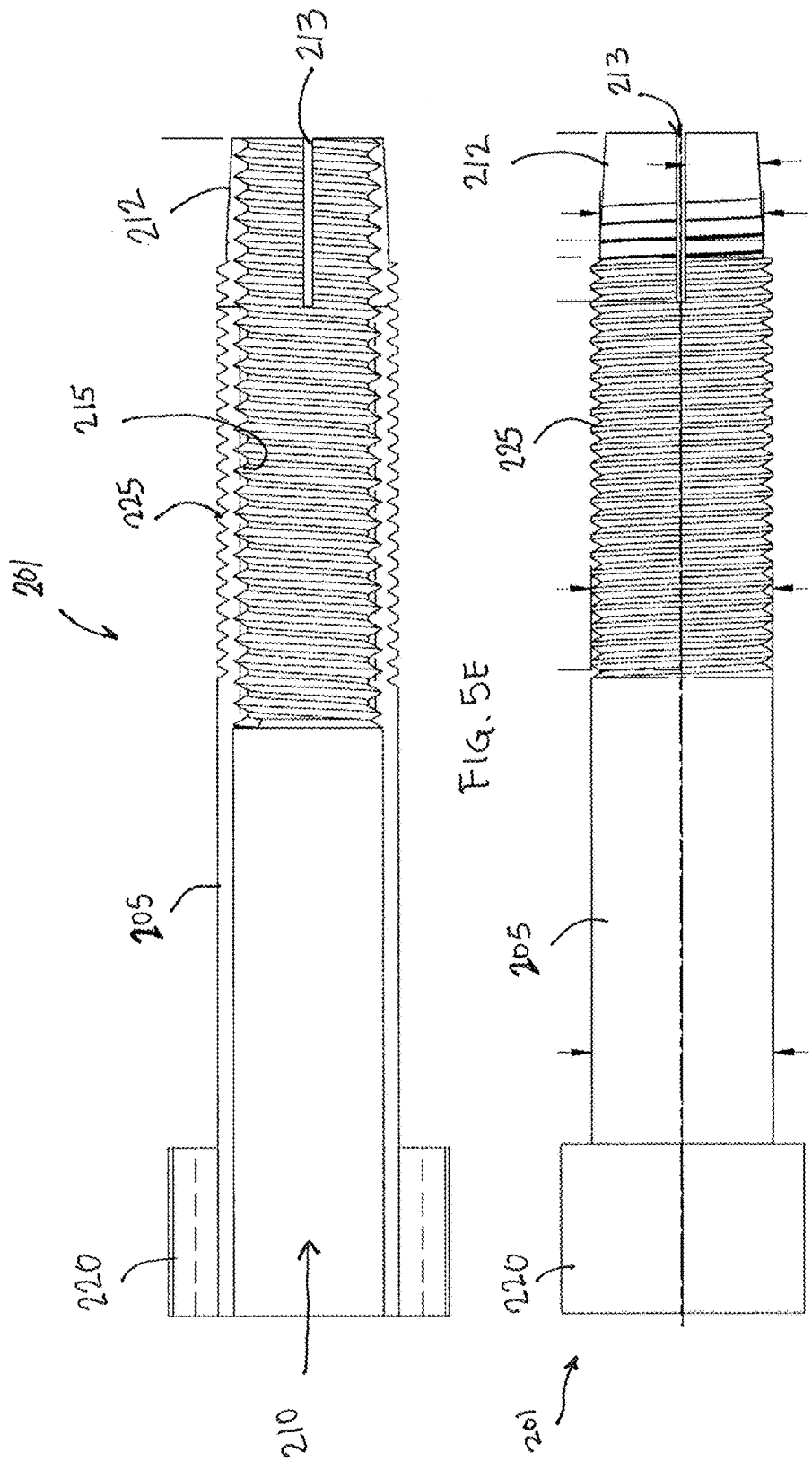

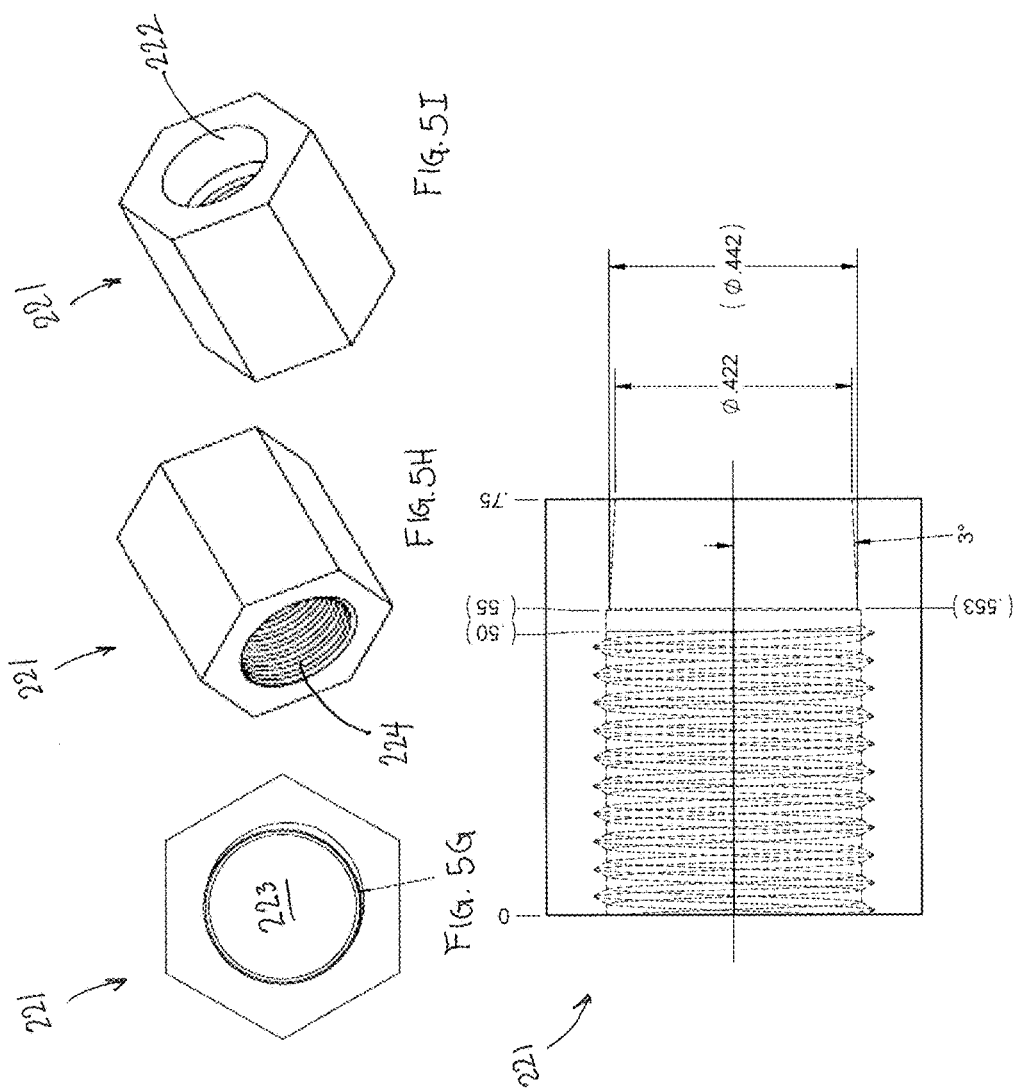

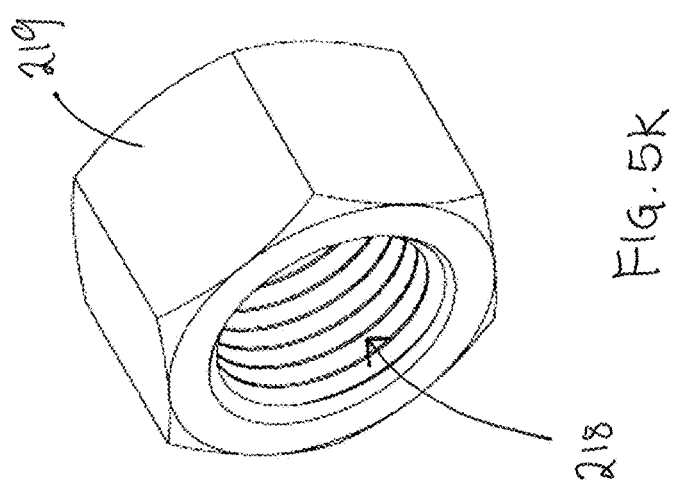

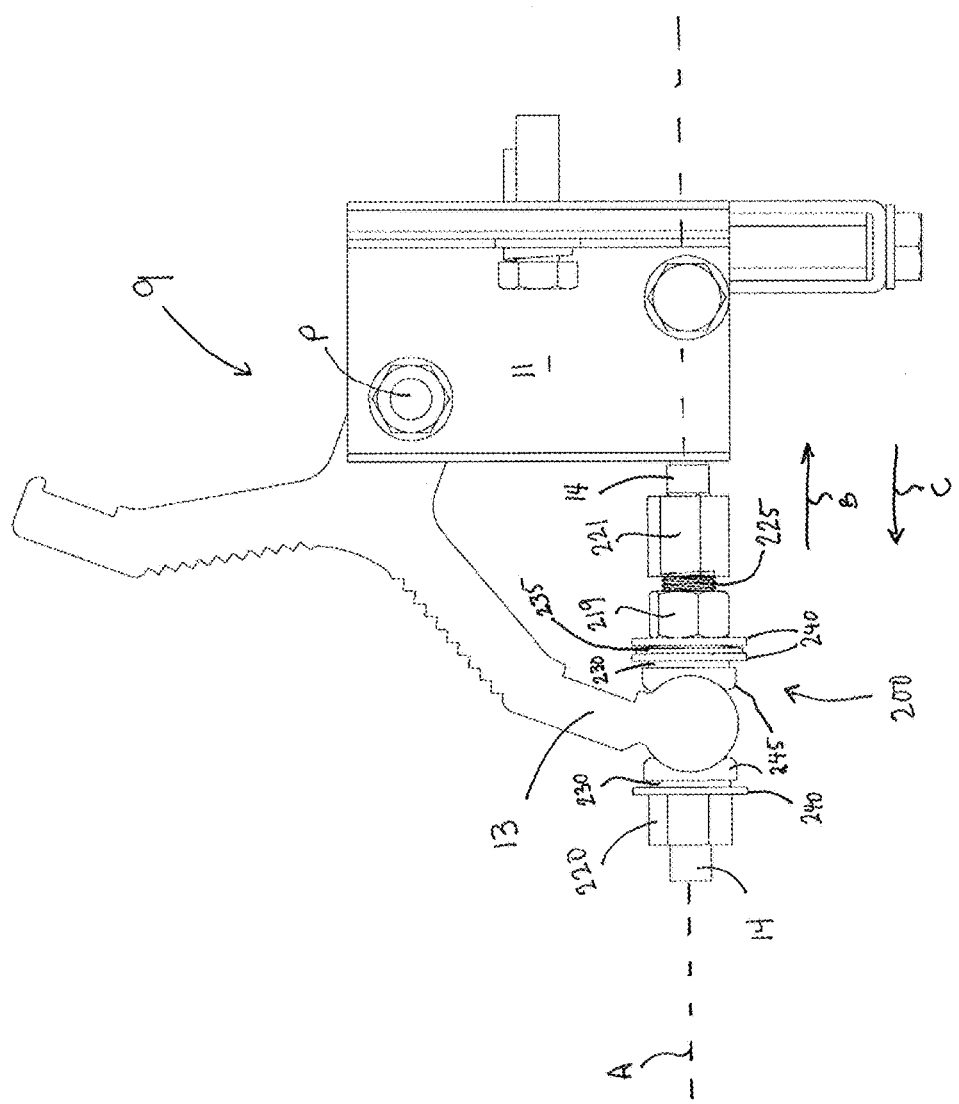

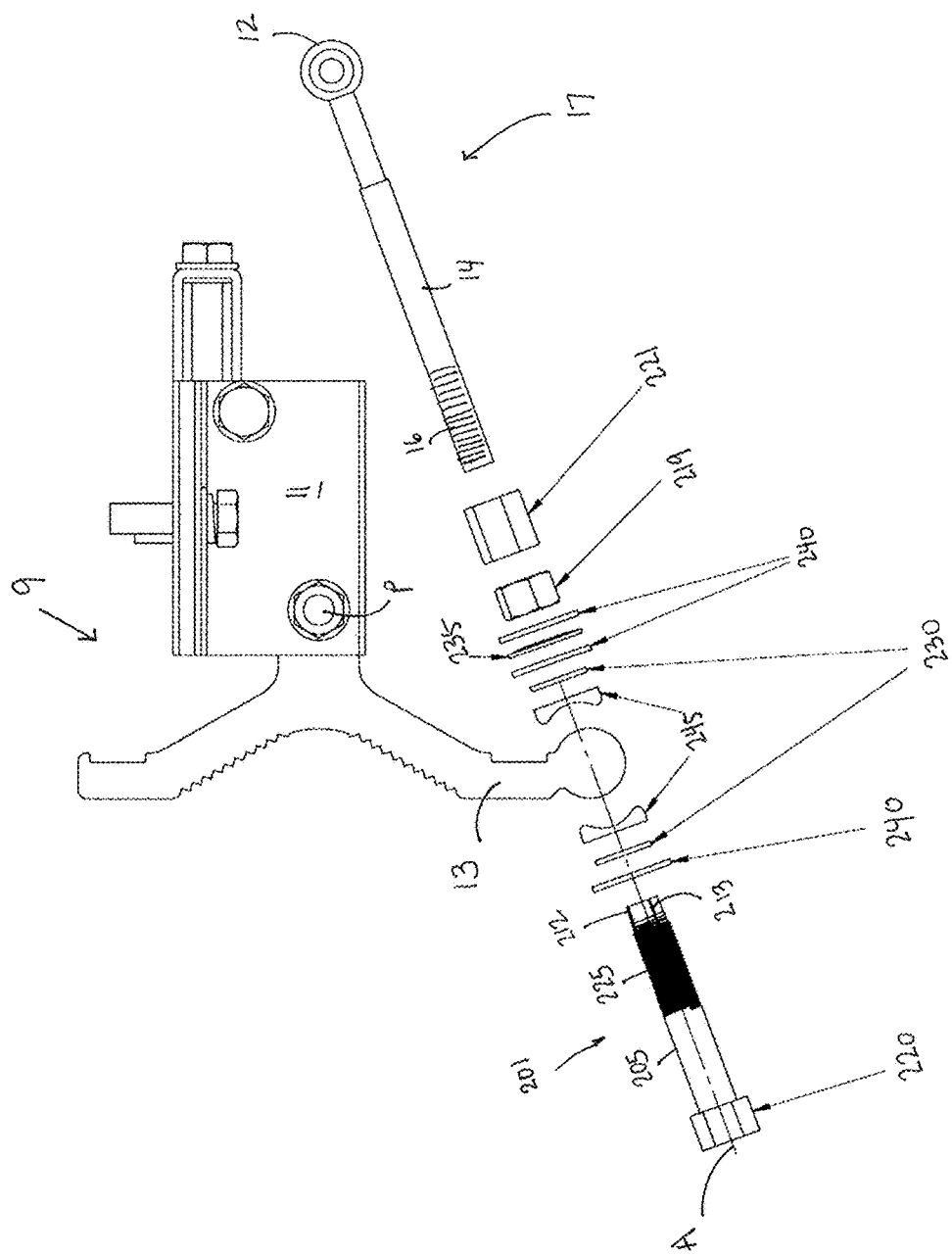

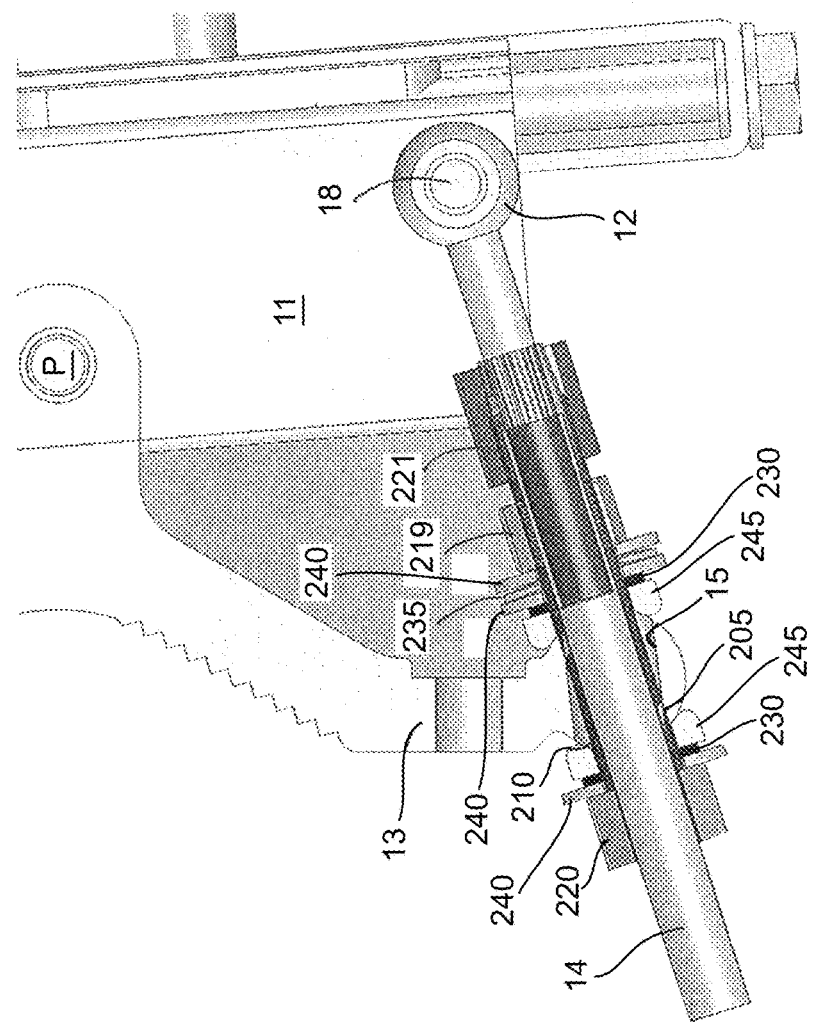

POSITION ADJUSTER FOR MILLIMETER WAVE ANTENNA

CROSS-REFERENCE TO PRIORITY DOCUMENT

This application claims priority of U.S. Provisional Application Ser. No. 62/031,022, filed Jul. 30, 2014. The full disclosure of the application is hereby incorporated by reference in its entirety.

FIELD

The subject matter described herein relates to adjustors for positioning devices such as radio communication antennas.

BACKGROUND

Extremely high frequency (EHF) are radio frequencies in the electromagnetic spectrum from 30 to 300 gigahertz. "E-Band" refers to any frequency within the following ranges: 71 to 76 gigahertz (GHz), 81 to 86 GHz, and 92 to 95 GHz. Transmissions in EHF including E-Band frequency range are characterized by relatively short distances, such as distances on the order of about 10 miles and antennas with relatively narrow beam widths, when compared to lower frequency transmission.

An obstacle to using E-Band communications is the alignment of antennas used in the E-Band frequency range. Since the frequencies are relatively high, the beam width of the antennas used in E-Band communications have very narrow beam widths when compared to traditional microwave antennas. The narrow beam widths of E-Band antennas make it more difficult to align the antenna. For example, when establishing an E-Band communication link using two E-Band transceivers, the antennas must be aligned to enable communications. Poor alignment may result in no signal or a degraded signal at the E-Band transceiver.

SUMMARY

In one aspect, there are provided systems, devices, and methods for positioning and adjusting devices such as radio communication antennas. The adjustor configured to position an antenna coupled to a mounting element includes an adjustor nut having a bore extending along a longitudinal axis of the adjustor nut from a distal end region to a proximal end region of the adjustor nut. At least a portion of the bore has inner threads configured to engage corresponding threads on a first portion of the mounting element positioned within the bore. The adjustor has a tool interface positioned near the proximal end region of the adjustor nut and an external fastening mechanism positioned near the distal end region of the adjustor nut. The adjustor has a preload nut configured to engage the external fastening mechanism and configured to apply a load onto a second portion of the mounting element positioned between a portion of the adjustor nut and the preload nut. Rotation of the adjustor nut around the longitudinal axis causes movement of the first portion of the mounting element along the longitudinal axis while the load is applied onto the second portion of the mounting element.

Movement of the first portion of the mounting element along the longitudinal axis can adjust the antenna along an elevation coordinate, an azimuth coordinate, or a polarization. The adjustor can further include a locknut. The locknut can be coupled to the mounting element or can be coupled to the adjustor nut. The locknut can include a central bore having a threaded region and an unthreaded region forming a tapered shoulder. The central bore can be configured to receive the distal end region of the adjustor nut. The threaded region can be sized to engage at least a portion of the external fastening mechanism positioned near the distal end region of the adjustor nut. When the locknut is loose, the locknut can travel along the longitudinal axis during movement of the first portion of the mounting element. When the locknut is tightened, the locknut can prevent movement of the first portion of the mounting element along the longitudinal axis.

An outer surface of the distal end region of the adjustor nut can form a tapered region. The tapered region can include one or more slits extending through a wall of the distal end region. Tightening of the locknut via rotation can advance the locknut toward the proximal end region of the adjustor nut and can cause engagement between the threaded region of the locknut with at least a portion of the external fastening mechanism of the adjustor nut. Further tightening of the locknut via rotation can advance the locknut further toward the proximal end region of the adjustor nut and can cause the tapered shoulder of the locknut to wedge against the tapered region of the adjustor nut. The tapered shoulder of the locknut wedged against the tapered region of the adjustor nut can narrow the one or more slits of the tapered region and can reduce an inner diameter of the tapered region. Reduction of the inner diameter can lock the adjustor nut onto the first portion of the mounting element. Locking the adjustor nut can prevent rotation of the adjustor nut around the longitudinal axis. At least a portion of the bore having inner threads can be within the distal end region of the adjustor nut.

At least a portion of the bore having inner threads can be within the adjustor nut from the distal end region to the proximal end region. The external fastening mechanism can include a fixation ring, pop rivet, weld, bond, interference fit, thread or combination thereof. The external fastening mechanism can include an external thread. The preload nut comprises a central bore having an inner thread configured to engage the external thread of the external fastening mechanism. Rotation of the preload nut can provide engagement between the inner thread and the external thread to advance the preload nut towards the proximal end region of the adjustor nut thereby applying the load. Rotation of the adjustor nut need not affect the load applied by the preload nut. The adjustor nut can provide a first bearing surface against an external side of the second portion of the mounting element. The preload nut can provide a second bearing surface against an internal side of the second portion of the mounting element. The adjustor can include one or more washers, spacers, cushions, bushings, bearings, springs or combinations thereof to reduce friction between the first bearing surface and the second bearing surface.

Rotation of the tool interface can rotate the adjustor nut. The tool interface can be integral with and form the portion of the adjustor nut such that the second portion of the mounting element is positioned between the tool interface and the preload nut. A tool configured to couple with the tool interface can also be configured to couple with the preload nut. The tool configured to couple with the tool interface and to the preload nut can also be configured to couple with a locknut configured to prevent movement of the first portion of the mounting element along the longitudinal axis. The tool interface can be a hex head.

The above-noted aspects and features may be implemented in systems, apparatus, and/or methods, depending on the desired configuration. The details of one or more variations of the subject matter described herein are set forth in the accompanying drawings and the description below. Features and advantages of the subject matter described herein will be apparent from the description and drawings, and from the claims.

BRIEF DESCRIPTION OF THE DRAWINGS

In the drawings,

FIGS. 2A and 2B depict perspective views of an adjustor nut of the adjustor of FIG. 1;

FIG. 2C depicts an end view of the adjustor nut;

FIGS. 5B and 5C depict end views of an adjustor nut of the adjustor of FIG. 4;

FIG. 5D depicts a perspective view of the adjustor nut of the adjustor of FIG. 4;

FIGS. 5E and 5F depict a cross-sectional view and a side view, respectively, of the adjustor nut of the adjustor of FIG. 4;

FIG. 5G depicts an end view of a locknut of the adjustor of FIG. 4;

FIGS. 5H and 5I depict perspective views of the locknut of the adjustor of FIG. 4;

FIG. 5J depicts a cross-sectional view of the locknut of the adjustor of FIG. 4;

FIG. 5K depicts a perspective view of a preload nut of the adjustor of FIG. 4;

FIG. 6A depicts a top elevational view of the adjustor of FIG. 4 in use with a mounting element for an antenna;

FIG. 6B depicts a partially exploded view of the adjustor in FIG. 6A;

FIG. 6C depicts a cross-sectional view of the adjustor in FIG. 6A.

DETAILED DESCRIPTION

Adjustments for antennas, point-to-point communications links, such as millimeter wave links, or other data communication devices involved in the transmitting and receiving of radio waves can be made along two coordinates including altitude or elevation above the horizon and azimuth or the angular measurement in a spherical coordinate system (i.e. left/right adjustment). An antenna can be mounted on a supporting structure, such as a pole of a tower or other structure, using a mounting element. The antenna can be installed manually by a technician. During installation, the technician must find the optimum position for the antenna along both elevation and azimuth coordinates. Azimuth adjustments, in particular, previously involved a series of trial-and-error adjustments including multiple rounds of tightening and loosening of the mounting element hardware to dither the antenna back and forth along the azimuth coordinate until the "sweet spot" was found. The installation process was time-consuming, inefficient and dangerous for the technician and for those that may be below the tower should a tool be dropped when switching between the multiple tools required for a single installation.

Described herein are adjustors configured to be used with mounting elements for adjusting the position of antennas. The adjustors described herein can provide efficient and precise adjustment for the antenna that can be performed using a single tool and a single hand. The adjustors described herein can be used to adjust azimuth as well as elevation, polarization, or any other type of adjustment.

Figure 1:
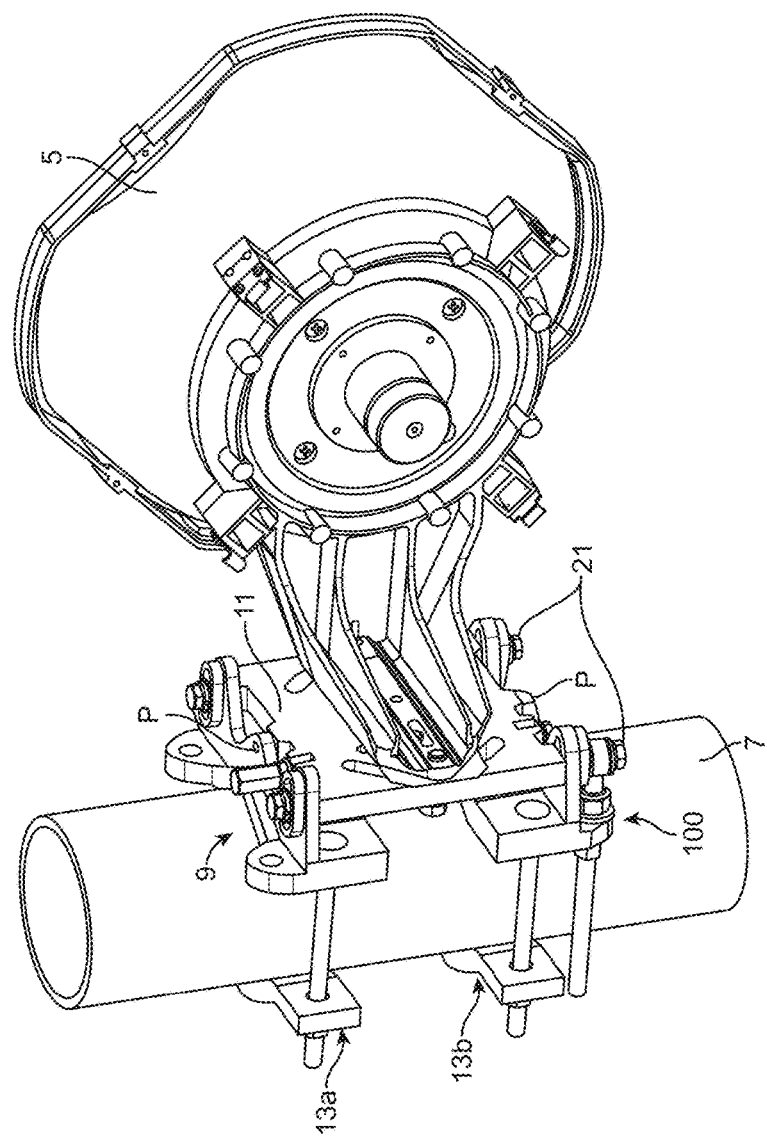
FIG. 1 depicts an implementation of an adjustor in use with a mounting element for an antenna.

FIG. 1 depicts an implementation of an adjustor 100 in use with a mounting element 9 for a device such as an antenna. The mounting element 9 can have a mounting plate 11 configured to attach to the antenna 5. The mounting element 9 can also include a pole mount 13 configured to be attached to the mounting plate 11, for example an upper pole mount assembly 13a and a lower pole mount assembly 13b, and configured to be coupled to the supporting structure 7. As will be described in detail below, the antenna 5 coupled to the mounting element 9 can be adjusted, for example for azimuth, elevation or polarization, using one or more adjustors 100 interfaced with a portion of the mounting element 9.

FIGS. 2A-2C show an implementation of an adjustor nut 101 for use with the adjustor 100. The adjustor nut 101 can include an elongate shaft 105 having a bore 110 extending through the length of the adjustor nut 101 along a longitudinal axis of the adjustor nut 101 from a distal end region to a proximal end region. At least a portion of the bore 110 can have inner threads 115 configured to engage with corresponding threads on an outer surface of a portion of the mounting element 9, as will be described in more detail below. The inner threads 115 can extend the entire length of the bore 110 or along a portion of the bore 110 near a distal end region. In some implementations, the inner threads 115 cover at least about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or greater percentage of the length of the bore 110 from the distal end region. The inner threads 115 can have a thread count that varies. The thread count of the inner threads 115 can be high enough to provide a precise adjustment. However, the thread count of the inner threads 115 should not be so high that the inner threads 115 cannot bear the load placed on them or require too many turns to achieve the desired adjustment. For example, a thread count can be selected that is suitable from a manufacturing stand-point that is also structurally stable and appropriately resolved for a given application. The thread count as well as any of the other relevant dimensions to the device can vary depending on what degree of freedom, level of torque, resolution etc. may be desirable for a particular intended use, the length of the lever arm, any manufacturing concerns, etc.

The adjustor 100 can include a tool interface 120. In some implementations, the tool interface 120 can be a proximal end region of the adjustor nut 101 such as a hex head or other feature configured to be engaged by a tool. The adjustor nut 101 can also include a distal end region having an external fastening mechanism 125. In some implementations, the external fastening mechanism 125 is a threaded outer surface along at least a portion of the length of the elongate shaft 105 from the distal-most end of the adjustor nut 101 configured to couple with a preload nut 119 (shown in FIG. 3A). In some implementations, the outer surface of the shaft 105 has a threaded surface extending from the distal-most end all the way to the tool interface 120 at the proximal end region. In other implementations, the outer surface of the shaft 105 has a threaded surface extending from the distal-most end to a region that is a distance away from the tool interface 120 such that at least a portion of the shaft 105 is not threaded. In some implementations, the threaded outer surface covers at least about 10%, about 15%, about 20%, about 25%, about 30%, about 35%, about 40%, about 45%, about 50%, about 55%, about 60%, about 65%, about 70%, about 75%, or greater percentage of the length of the elongate shaft 105 from the distal end region. It should be appreciated that the external fastening mechanism 125 near the distal end region need not be a threaded outer surface and can vary including, but not limited to a fixation ring, pop rivet, weld, bonding, interference fit, or other fastening mechanism or combinations thereof, for example a combination of threads and thread-locking adhesive or a spot weld.

Figure 3A:
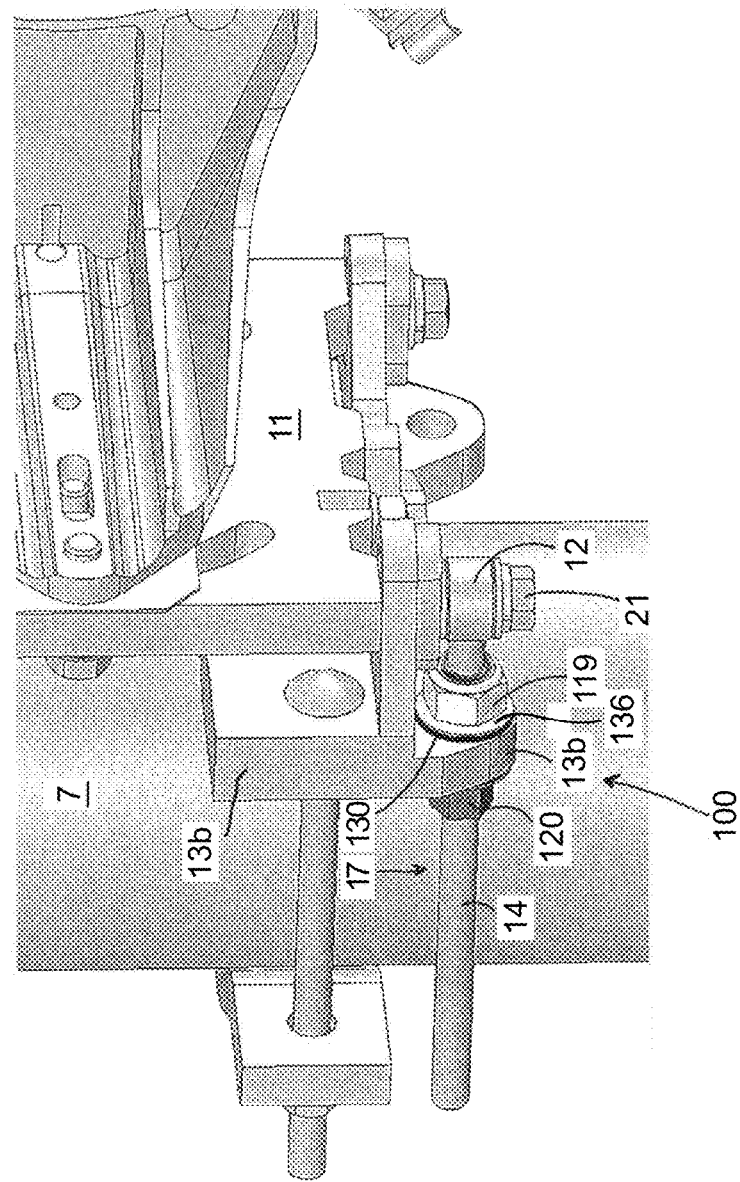
FIG. 3A depicts a detailed view of the adjustor of FIG. 1.
Figure 3B:
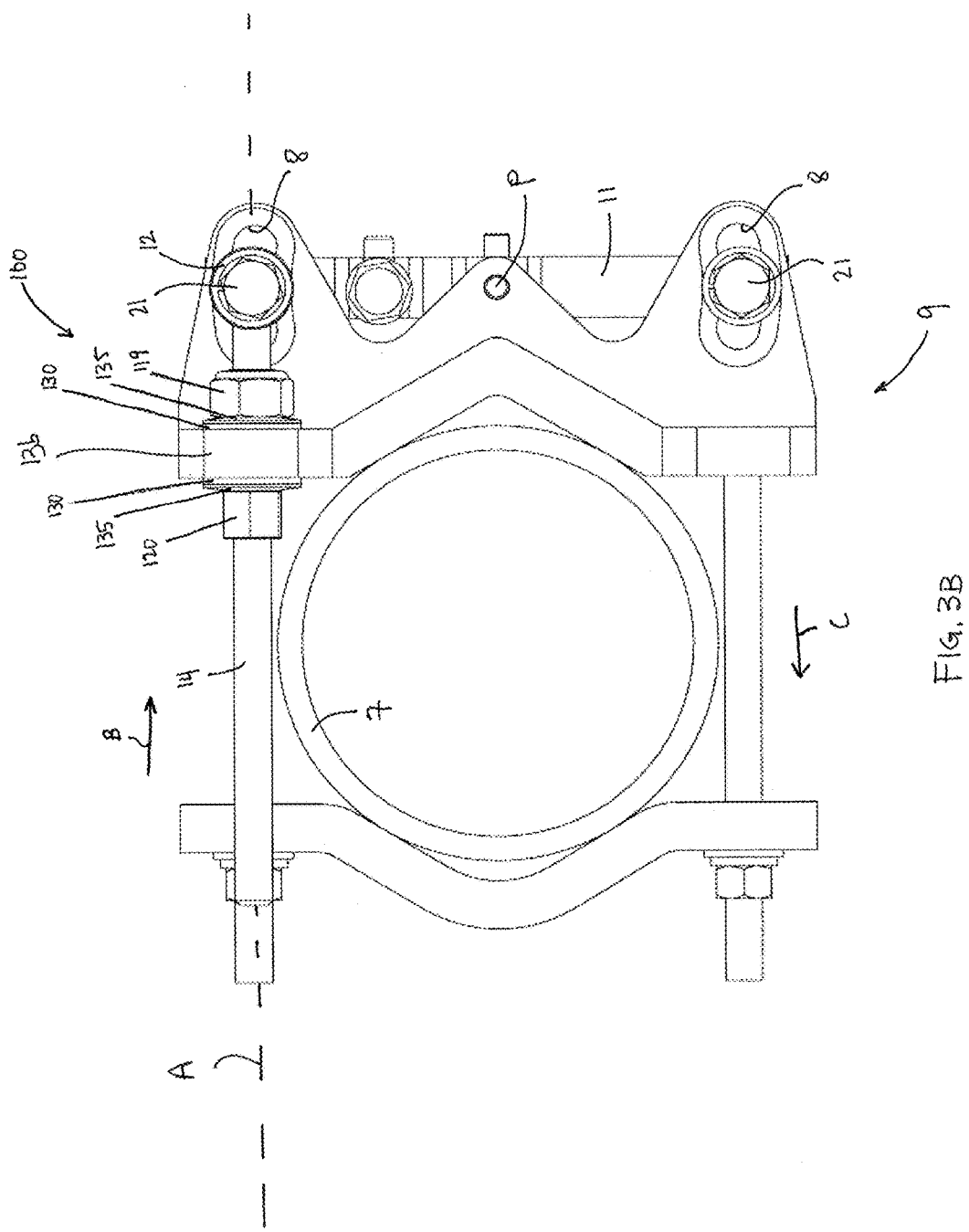
FIG. 3B depicts a bottom view of the adjustor of FIG. 1.
Figure 3C:
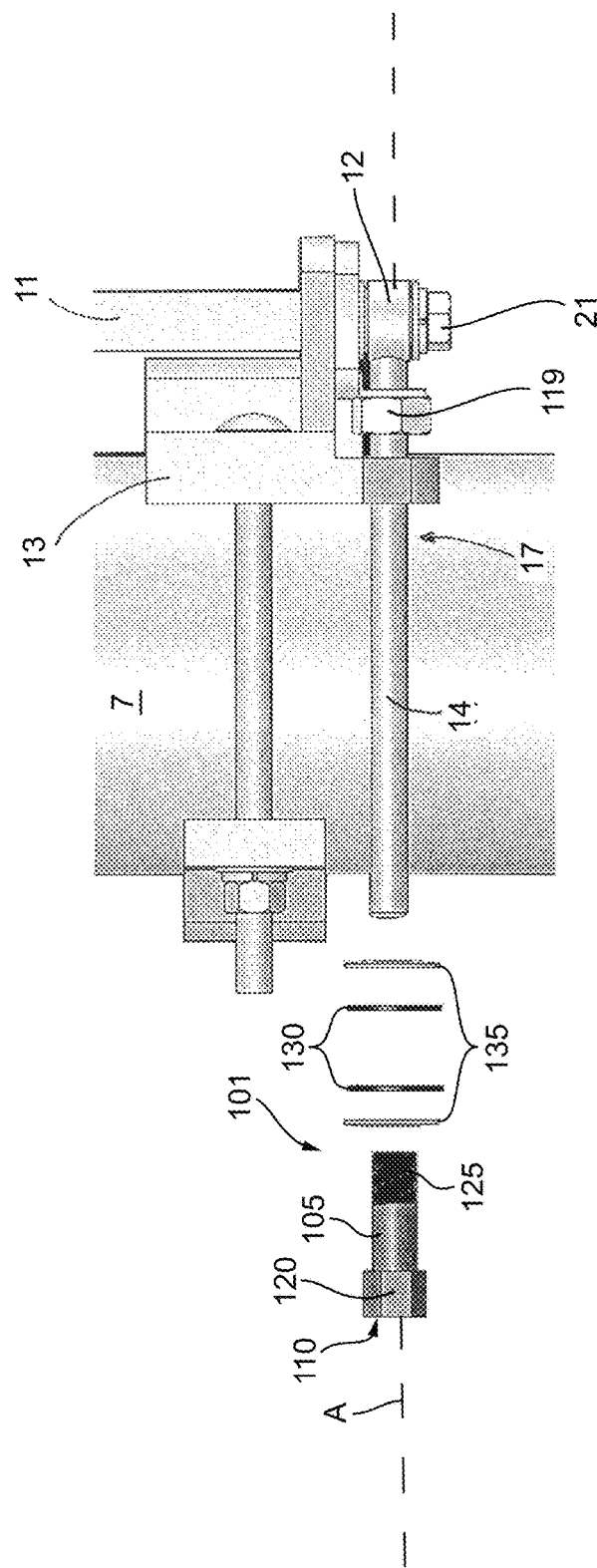
FIG. 3C depicts a partially exploded view of the adjustor of FIG. 1.
Figure 3D:
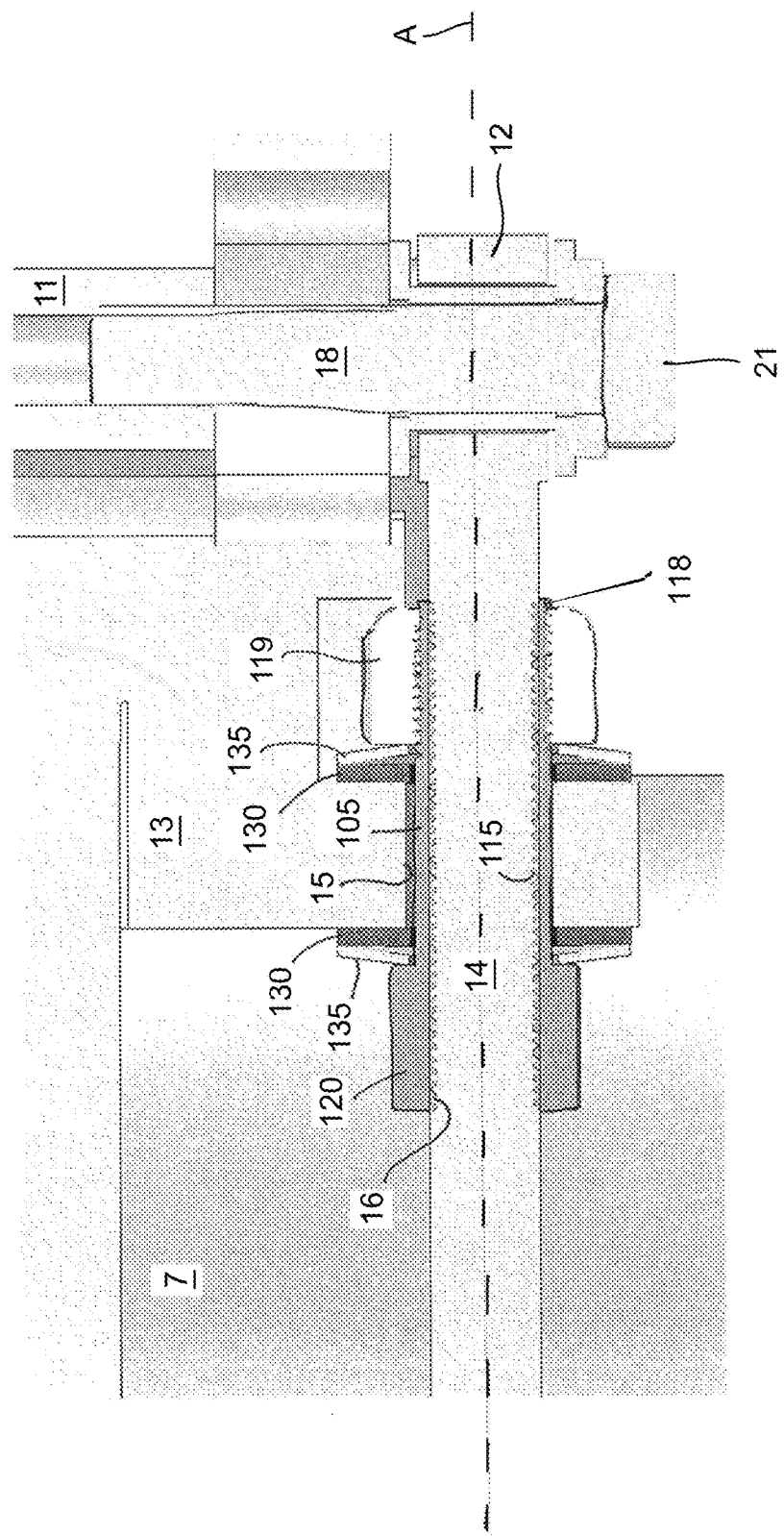
FIG. 3D depicts a cross-sectional view of the adjustor of FIG. 1.

FIG. 3A is a detailed view of FIG. 1 showing the adjustor 100 engaged with a mounting element 9. FIG. 3B is a view from below, FIG. 3C is a partially exploded view, and FIG. 3D is a cross-sectional view showing how the adjustor 100 can interface with the mounting element 9. As mentioned above, the mounting element 9 can include a mounting plate 11 configured to couple to a device, such as an antenna, and a pole mount 13 configured to couple to a supporting structure 7. The pole mount 13 can include an upper assembly 13a (see FIG. 1) and a lower assembly 13b. The upper assembly 13a can be configured to couple to an upper end region of the mounting plate 11 and the lower assembly 13b can be configured to couple to a lower end region of the mounting plate 11. The upper and lower pole mount assemblies 13a, 13b can include slotted features 8 (best shown in FIG. 3B) each configured to align with and receive a bolt 18 coupled to a region of the mounting plate 11 (best shown in FIG. 3D). For example, the upper pole mount assembly 13a can include left-side and right-side slotted features 8 configured to align with and receive bolts 18 coupled to the left side and right side of the upper end region of the mounting plate 11, respectively. The lower pole mount assembly 13b can also include left-side and right-side slotted features 8 configured to align with and receive bolts 18 coupled to the left side and right side of the lower end region of the mounting plate 11, respectively. The upper and lower pole mount assemblies 13a, 13b can also be connected to the upper end region of the mounting plate 11 at upper pivoting point P and to the lower end region of the mounting plate 11 at lower pivoting point P (best shown in FIG. 1 and FIG. 3B). The upper and lower pivoting points P can be aligned with one another, for example along a midline of the mounting plate 11 such that they are positioned midway between the coupling of the bolts 18 within their respective slotted features 8. For example, as the right side bolts 18 move within their respective slotted features 8 away from the supporting structure 7, mounting plate 11 can pivot around pivoting points P and the left side bolts 18 can move within their respective slotted features 8 toward the supporting structure 7. As the right side bolts 18 move within their respective slotted features 8 toward the supporting structure 7, mounting plate 11 can pivot around pivoting points P and the left side bolts 18 can move within their respective slotted features 8 away from the supporting structure 7. A locknut 21 can be positioned onto an end of each bolt 18 such that the bolts 18 can be locked into position relative to the mounting plate 11 and the pole mounts 13 once left/right (i.e. azimuth) adjustment is finalized. It should be appreciated that the configuration of the coupling between the pole mounts 13 and the mounting plate 11 can vary and can include any number of connections. It should also be appreciated that the adjustors described herein can interface with the mounting element 9 near the right side or left side or both. Similarly, it should be appreciated that the adjustors described herein can interface with the mounting element 9 near an upper end region of the mounting plate 11 or the lower end region of the mounting plate 11.

Again with respect to FIGS. 3A-3D, the mounting element 9 can also include a coupler 17 having a first region 12 and a second region 14. In some implementations, the coupler 17 is an eye bolt and the eye of the eye bolt forms the first region 12 of the coupler 17 and the elongate shaft of the eye bolt forms the second region 14 of the coupler 17. The first region 12 of the coupler 17 can interface with a bolt 18 coupled to the mounting plate 11, including any one of the left upper, left lower, right upper, or right lower bolts 18 of the mounting plate 11 as described above. The second region 14 of the coupler 17 can project away from where the first region 12 couples to the mounting plate 11 and extend through an aperture 15 in a corresponding region of the pole mount 13 (best shown in FIG. 3D). As mentioned above, a locknut 21 can be positioned onto a threaded end of each bolt 18 such that the upper and lower pole mount assemblies 13a, 13b can be locked into position relative to the mounting plate 11. One of the locknuts 21 can be tightened down onto the first region 12 of the coupler 17 positioned over its respective bolt 18 such that the bolt 18 is unable to move within the slotted feature 8 of the pole mount 13.

The adjustor nut 101 can interface with the coupler 17 thereby forming an adjustable connection between the mounting plate 11 and the pole mount 13 such that the antenna coupled to the mounting plate 11 can be adjusted, for example along the azimuth coordinate. The adjustor nut 101 can be inserted over and threaded onto the second region 14 of the coupler 17 such that the second region 14 extends through the bore 110 of the adjustor nut 101. A distal-most end of the second region 14 of the coupler 17 can extend beyond the tool interface 120 of the adjustor nut 101 such that the second region 14 projects out the proximal end of the adjustor nut 101. The elongate shaft 105 of the adjustor nut 101 and the second region 14 threaded through the bore 110 of the adjustor nut 101 both can extend through the aperture 15 of the pole mount 13 (see FIG. 3D). The distal end region of the adjustor nut 101 including at least a portion of the external fastening mechanism 125 can extend to an internal side of the mounting element 9. The proximal end region of the adjustor nut 101 including the tool interface 120 can be prevented from extending through the aperture 15 such that the tool interface 120 remains positioned on an external side of the mounting element 9. In this context, the "internal side" of the mounting element 9 can refer to a location that is between a side of the mounting plate 11 and/or its associated hardware that faces towards the supporting structure 7 and a side of the pole mount 13 facing away from the supporting structure 7 and towards the mounting plate 11. Further, the "external side" of the mounting element 9 can refer to a location that is on a side of the pole mount 13 facing away from the mounting plate 11. Positioning the tool interface 120 on the external side of the mounting element 9 can provide for the adjustor 100 to be more easily accessed and rotated using a tool even when the adjustor 100 and the mounting element 9 are positioned on the supporting structure 7.

The adjustor 100 can also include a preload nut 119. The preload nut 119 can include a central bore 118 such that it can be positioned over the distal end region of the shaft 105 and thus, also over the second region 14 of the coupler 17 extending through the bore 110 of the adjustor nut 101. When the adjustor nut 101 is threaded over the second portion 14 of the coupler 17 via the bore 110 and inserted through the aperture 15 such that the external fastening mechanism 125 on the distal end region of the adjustor nut 101 extends to the internal side of the mounting element 9, the preload nut 119 can be positioned over the distal end region of the adjustor nut 101 on the internal side of the mounting element 9. In some implementations, the external fastening mechanism 125 of the adjustor nut 101 is a threaded outer surface. The central bore 118 of the preload nut 119 can have corresponding threads configured to receive and engage the threaded outer surface of the external fastening mechanism 125 (see FIG. 3D). Rotation of the preload nut 119 in a first direction can result in engagement between the threaded outer surface of the adjustor nut 101 and the corresponding threads of the central bore 118 such that the preload nut 119 advances over the distal end region of the adjustor nut 101 towards the tool interface 120. The tool interface 120 of the adjustor nut 101 and the preload nut 119 each can have an outer diameter that is larger than a diameter of the aperture 15 such that with further rotation and advancement of the preload nut 119 along the shaft 105 of the adjustor nut 101 toward the tool interface 120, a bearing surface of the preload nut 119 can abut a surface of the pole mount 13 surrounding the aperture 15 on the internal side of the mounting element 9. Similarly, a bearing surface of the tool interface 120 can abut a surface of the pole mount 13 surrounding the aperture 15 on the external side of the mounting element 9. The bearing surfaces of the preload nut 119 and the tool interface 120 against the pole mount 13 positioned therebetween provides preload to the system. The engagement between the first region 12 of the coupler 17 and the bolt 18 of the mounting plate 11, the threaded engagement between the second region 14 of the coupler and the adjustor nut 101, and also the preload applied between the preload nut 119, the pole mount 13 and the tool interface 120 can couple the pole mount 13 to the mounting plate 11.

Although the tool interface 120 and the preload nut 119 can provide bearing surfaces against the pole mount 13 surrounding the aperture 15, it should be appreciated that one or more combinations of washers, spacers, cushions, bushings, bearings, springs or other features can be incorporated to affect the load achieved. In an implementation, one or more thrust bearings 130 can be positioned, for example, on either side of the aperture 15 in the pole mount 13. In a further implementation, one or more springs 135 such as a Belleville disc spring can be positioned, for example, against the respective thrust bearings 130 (see FIG. 3D). The bearings can reduce the friction between the adjustor nut 101 and the preload nut 119 relative to the pole mount 13 such that the preload can remain constant during adjustment of the position along the longitudinal axis A. It should be appreciated, however, that the friction can be low enough to not necessitate the use of bearings.

The adjustor 100 can allow for adjustment even after a preload is applied with the preload nut 119. The tension applied by the preload nut 119 can travel along during the adjustment. As mentioned above, the bore 110 of the adjustor nut 101 can have inner threads 115. At least a portion of the second region 14 of the coupler 17 can have outer threads 16 configured to engage the inner threads 115 of the bore 110 through which the second region 14 extends. Rotation of the adjustor nut 101 can result in movement of the coupler 17 along a longitudinal axis A due to the engagement between the inner threads 115 and the outer threads 16. This can be performed even when tension or a load is applied by the preload nut 119 such that adjustment can be made in a precise way without multiple rounds of trial-and-error loosening and tightening of various hardware components on the mounting element 9. Movement of the coupler 17 along the longitudinal axis A can provide adjustment of the mounting plate 11 (assuming locknuts 21 are not tightened down). For example and as best shown in FIG. 3B, rotation of the adjustor nut 101 in a first direction around the longitudinal axis A, for example by engaging the tool interface 120 with a tool, can cause the coupler 17 to move in a first direction along the longitudinal axis A, for example a direction that is towards the mounting plate 11 along arrow B. The first region 12 of the coupler 17 can be coupled to bolt 18 of the mounting plate 11 and can apply a force to the bolt 18 as the coupler 17 is moved in the first direction towards the mounting plate 11. This can cause the bolt 18 to be moved within its respective slotted feature 8 in generally the same direction the coupler 17 is moved (i.e. towards the mounting plate 11 along arrow B). Mounting plate 11 can pivot around pivoting points P and a bolt 18 on the opposite side of the mounting plate 11 can move within its respective slotted feature 8 in an opposite direction (i.e. away from the mounting plate 11 along arrow C) turning the mounting plate 11, for example, to the right. Rotation of the adjustor nut 101 in a second, opposite direction around the longitudinal axis A can cause the coupler 17 to move in a direction along the longitudinal axis A that is away from the mounting plate 11 along arrow C. As the coupler 17 is moved in the second direction away from the mounting plate 11, a force can be applied by the first region 12 of the coupler 17 coupled to bolt 18 causing the bolt 18 to move within its respective slotted feature 8 in generally the same direction the coupler 17 is moved (i.e. away from the mounting plate 11 along arrow C) turning the mounting plate 11, for example, to the left. Mounting plate 11 can pivot back around pivoting points P and the bolt 18 on the opposite side of the mounting plate 11 can move within its respective slotted feature 8 in a direction that is toward the mounting plate 11 along arrow B. In some implementations, the slotted features 8 can be straight, for example aligned with the longitudinal axis A of the coupler 17. In other implementations, the slotted features 8 can be slightly curved such that the bolts 18 can move along the longitudinal axis A as well as some degree toward or away from the longitudinal axis A. Once the appropriate adjustments are made using the adjustor 100, the position can be locked by tightening one or more of the locknuts 21. Tightening the locknuts 21 can prevent movement of the bolts 18 within their respective slotted features 8.

Figure 4:
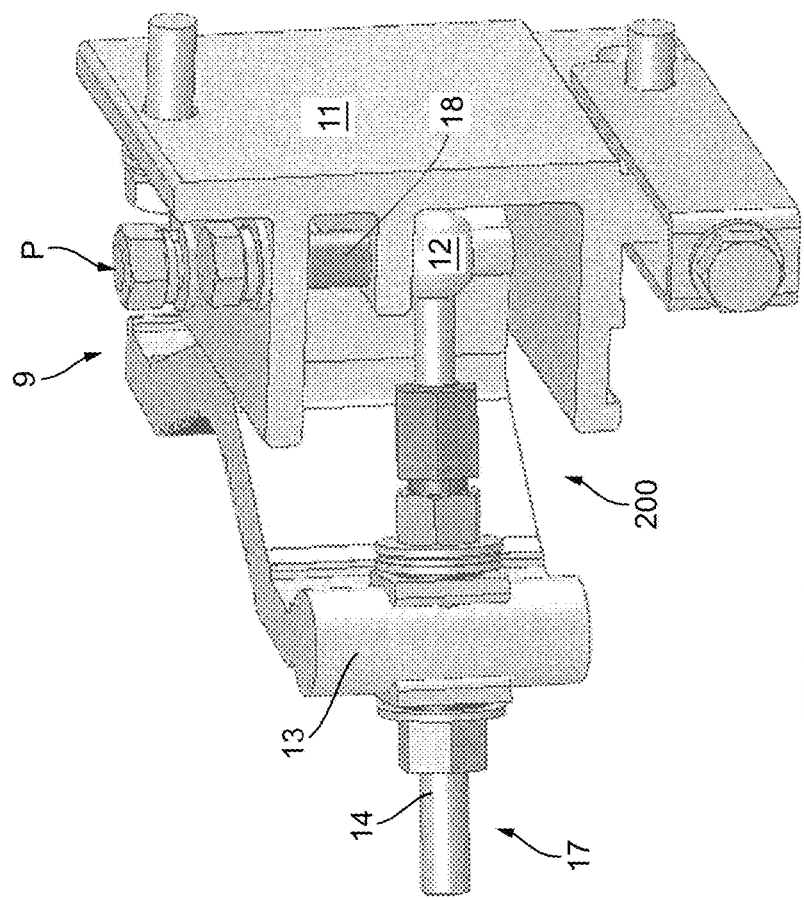
FIG. 4 depicts an implementation of an adjustor in use with a mounting element for an antenna.

FIG. 4 illustrates another implementation of an adjustor 200 capable of adjusting azimuth of an antenna mounted on a supporting structure after tension is applied by the adjustor on the mounting element. The mounting element 9 can have a mounting plate 11 configured to attach to an antenna (not shown). The mounting element 9 can include a pole mount 13 configured to be attached to the mounting plate 11 and configured to be coupled to the supporting structure (not shown). As will be described in detail below, an antenna coupled to the mounting element 9 can be adjusted, for example for azimuth, elevation or polarization, using one or more adjustors 200 interfaced with a portion of the mounting element 9.

Figure 5A:
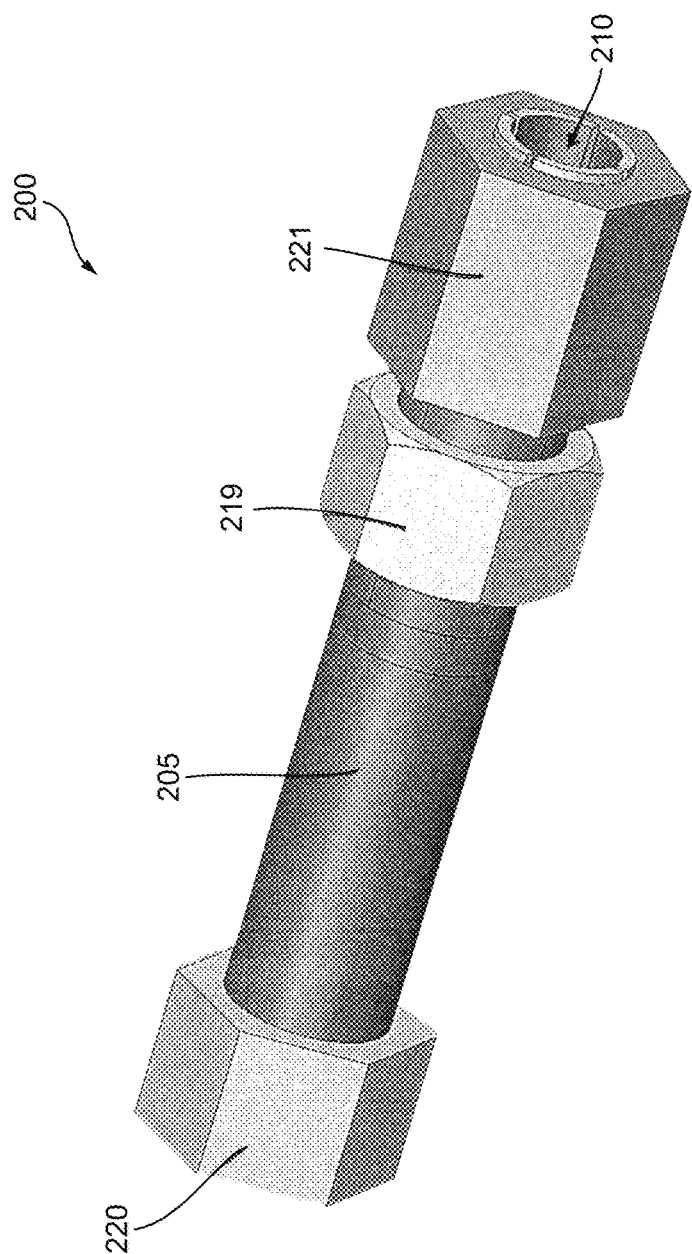
FIG. 5A depicts a perspective view of the adjustor of FIG. 4.

FIG. 5A shows an implementation of an adjustor 200. The adjustor 200 can include an adjustor nut 201 having elongate shaft 205 having a bore 210 extending through the length of the adjustor nut 201 along a longitudinal axis of the adjustor nut 201 from a distal end region to a proximal end region (see FIGS. 5B-5F). At least a portion of the bore 210 can have inner threads 215 configured to engage with corresponding threads on an outer surface of a portion of the mounting element 9, as will be described in more detail below. The inner threads 215 can extend the entire length of the bore 210 or along a portion of the bore 210 near a distal end region (see FIG. 5E). In some implementations, the inner threads 215 cover at least about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or greater percentage of the length of the bore 210 from the distal end region. The inner threads 215 can have a thread count that varies. The thread count of the inner threads 215 can be high enough to provide a precise adjustment. However, the thread count of the inner threads 215 should not be so high that the inner threads 215 cannot bear the load placed on them or require too many turns to achieve the desired adjustment. As described above, the thread count as well as any of the other relevant dimensions to the device can vary depending on what degree of freedom, level of torque, resolution etc. may be desirable for a particular intended use.

As shown in FIGS. 5A-5F, the adjustor 200 can include a tool interface 220. In some implementations, the tool interface 220 can be a proximal end region of the adjustor nut 201 such as a hex head or other feature configured to be engaged by a tool. The adjustor nut 101 can also include a distal end region having an external fastening mechanism 225. In some implementations, the external fastening mechanism 225 is a threaded outer surface along at least a portion of the length of the elongate shaft 205 from the distal-most end of the adjustor nut 201 configured to couple with a preload nut 219 (shown in FIGS. 5A and 5K). In some implementations, the outer surface of the shaft 205 has a threaded surface extending from the distal-most end all the way to the tool interface 220 at the proximal end region. In other implementations, the outer surface of the shaft 205 has a threaded surface extending from the distal-most end to a region that is a distance away from the tool interface 220 such that at least a portion of the shaft 205 is not threaded (see FIG. 5F). In some implementations, the threaded outer surface covers at least about 10%, about 15%, about 20%, about 25%, about 30%, about 35%, about 40%, about 45%, about 50%, about 55%, about 60%, about 65%, about 70%, about 75%, or greater percentage of the length of the elongate shaft 205 from the distal end region. It should be appreciated that the external fastening mechanism 225 near the distal end region need not be a threaded outer surface and can vary including, but not limited to a fixation ring, pop rivet, weld, bonding, interference fit, or other fastening mechanism or combinations thereof, for example a combination of threads and thread-locking adhesive or a spot weld.

FIGS. 6A-6C illustrate how the adjustor 200 can interface with the mounting element 9. As mentioned above, the mounting element 9 can include a mounting plate 11 configured to couple to an antenna and a pole mount 13 configured to couple to a supporting structure 7. The mounting plate 11 can be coupled to the pole mount 13 via a pivoting point P. The mounting element 9 can also include a coupler 17 having a first region 12 and a second region 14 (best shown in FIG. 6B). In some implementations, the coupler 17 is an eye bolt and the eye of the eye bolt forms the first region 12 of the coupler 17 and the elongate shaft of the eye bolt forms the second region 14 of the coupler 17. The first region 12 of the coupler 17 can interface with a bolt 18 coupled to the mounting plate 11 (best shown in FIG. 4). The second region 14 of the coupler 17 can project away from where the first region 12 couples to the bolt 18 of the mounting plate 11 and extend through an aperture 15 in a corresponding region of the pole mount 13 (best shown in FIG. 6C).

The adjustor nut 201 can interface with the coupler 17 thereby forming an adjustable connection between the mounting plate 11 and the pole mount 13 such that a device, like an antenna, coupled to the mounting plate 11 can be adjusted, such as for azimuth, elevation or polarization. The adjustor nut 201 can be inserted over and threaded onto the second region 14 of the coupler 17 such that the second region 14 extends through the bore 210 of the adjustor nut 201. A distal-most end of the second region 14 of the coupler 17 can extend beyond the tool interface 220 such that it projects out the proximal end of the adjustor nut 201. The elongate shaft 205 of the adjustor nut 201 and the second region 14 threaded through the bore 210 of the adjustor nut 201 both can extend through the aperture 15 of the pole mount 13 (see FIG. 6C). The distal end region of the adjustor nut 201 including at least a portion of the external fastening mechanism 225 can be positioned on an internal side of the mounting element 9. The proximal end region of the adjustor nut 201 including the tool interface 220 can be prevented from extending through the aperture 15 such that it remains positioned on an external side of the mounting element 9. In this context, the "internal side" of the mounting element 9 can refer to a location that is between a side of the mounting plate 11 and/or its associated hardware that faces towards the supporting structure 7 and a side of the pole mount 13 facing away from the supporting structure 7 and towards the mounting plate 11. Further, the "external side" of the mounting element 9 can refer to a location that is on a side of the pole mount 13 facing away from the mounting plate 11. Positioning the tool interface 220 on the external side of the mounting element 9 can provide for the adjustor 200 to be more easily accessed and rotated using a tool even when the adjustor 200 and the mounting element 9 position onto the supporting structure 7.

As mentioned above, the adjustor 200 can also include a preload nut 219. The preload nut 219 can include a central bore 218 such that it can be positioned over the distal end region of the shaft 205 and thus, also over the second region 14 of the coupler 17 extending through the bore 210 of the adjustor nut 201. When the adjustor nut 201 is threaded over the second portion 14 of the coupler 17 via the bore 210 and inserted through the aperture 15 such that the external fastening mechanism 225 on the distal end region of the adjustor nut 201 extends to the internal side of the mounting element 9, the preload nut 219 can be positioned over the distal end region of the adjustor nut 201 on the internal side of the mounting element 9. In some implementations, the external fastening mechanism 225 of the adjustor nut 201 is a threaded outer surface. The central bore 218 of the preload nut 219 can have corresponding threads configured to receive and engage the threaded outer surface of the external fastening mechanism 225 (see FIG. 5K). Rotation of the preload nut 219 in a first direction can result in engagement between the threaded outer surface of the adjustor nut 201 and the corresponding threads of the central bore 218 such that the preload nut 219 advances over the distal end region of the adjustor nut 201 towards the tool interface 220. The tool interface 220 of the adjustor nut 201 and the preload nut 219 each can have an outer diameter that is larger than a diameter of the aperture 15 such that with further rotation and advancement of the preload nut 219 along the shaft 205 of the adjustor nut 201 toward the tool interface 220, a bearing surface of the preload nut 219 can abut a surface of the pole mount 13 surrounding the aperture 15 on the internal side of the mounting element 9. Similarly, a bearing surface of the tool interface 220 can abut a surface of the pole mount 13 surrounding the aperture 15 on the external side of the mounting element 9. The bearing surfaces of the preload nut 219 and the tool interface 220 against the pole mount 13 positioned therebetween provides preload to the system. The engagement between the first region 12 of the coupler 17 and the bolt 18 of the mounting plate 11, the threaded engagement between the second region 14 of the coupler and the adjustor nut 201, and also the preload applied between the preload nut 219, the pole mount 13 and the tool interface 220 can couple the pole mount 13 to the mounting plate 11.

Although the tool interface 220 and the preload nut 219 can provide bearing surfaces against the pole mount 13 surrounding the aperture 15, it should be appreciated that one or more combinations of washers, spacers, cushions, bushings, bearings, springs or other features can be incorporated to affect the load achieved. As shown in FIG. 6B, one or more thrust bearings 230, springs 235 such as Belleville disc springs, flat washers 240, and cushion blocks 245 can be positioned, for example, on one or both sides of the aperture 15 in the pole mount 13.

The adjustor 200 can allow for adjustment even after a preload is applied with the preload nut 219. The tension applied by the preload nut 219 can travel along during the adjustment. As mentioned above, the bore 210 of the adjustor nut 201 can have inner threads 215. At least a portion of the second region 14 of the coupler 17 can have outer threads 16 configured to engage the inner threads 215 of the bore 210 through which the second region 14 extends (see FIG. 6B). Rotation of the adjustor nut 201 can result in movement of the coupler 17 along a longitudinal axis A due to the engagement between the inner threads 215 and the outer threads 16. This can be performed even when tension or a load is applied by the preload nut 119 such that adjustment can be made in a precise way without multiple rounds of trial-and-error loosening and tightening of various hardware components on the mounting element 9. Movement of the coupler 17 along the longitudinal axis A can provide adjustment of the mounting plate 11. For example, rotation of the adjustor nut 201 in a first direction around the longitudinal axis A, for example by engaging the tool interface 220 with a tool, can cause the coupler 17 to move in a first direction along the longitudinal axis A, for example, a direction that is towards the mounting plate 11 along arrow B. The first region 12 of the coupler can be coupled to bolt 18 of the mounting plate 11 and can apply a force to the bolt 18 as the coupler 17 is moved in the first direction towards the mounting plate 11. The bolt 18 and the pivoting point P can be positioned a distance away from one another and at an angle relative to one another such that upon movement of the coupler 17, the bolt 18 and the mounting point 11 to which the bolt 18 is attached can move a particular degree around pivoting point P relative to the pole mount 13 (i.e. toward the left). Rotation of the adjustor nut 201 in a second, opposite direction around the longitudinal axis A can cause the coupler 17 to move in a direction along the longitudinal axis A that is away from the mounting plate 11 along arrow C. As the coupler 17 is moved in the second direction away from the mounting plate 11, a force can be applied by the first region 12 of the coupler 17 coupled to the bolt 18 causing the bolt 18 and the mounting plate 11 to which the bolt 18 is attached to move a particular degree around pivoting point P relative to the pole mount 13 in an opposite direction (i.e. toward the right).

The adjustor 200 can also include a locknut 221 (see FIGS. 5A, and 5G-5J). The locknut 221 can have a central bore 223 having a first region having inner threads 224 and a second unthreaded region having a tapered shoulder 222. The inner threads 224 can be sized to engage at least a portion of the external fastening mechanism 225 of the elongate shaft 205 near the distal end of the shaft 205. The locknut 221 can be positioned over a portion of the second region 14 of the coupler 17 on the internal side of the mounting element 9 during adjustments with the adjustor 200. The locknut 221 can also be at least partially positioned over the distal end of the shaft 205 during adjustments. Once the appropriate adjustments are made using the adjustor 200 as described above, the position can be locked using the locknut 221 as will be described below. This "traveling" lock down feature allows the locknut to remain relatively loose and travel along with the adjustor 200 during adjustment until lock down of the mounting plate 11 position is desired. Rotation of the locknut 221 to provide lock down of the position can be performed using the same tool used for rotation of the adjustor nut 201 during adjustment. Thus, the external geometry of the tool interface 220 and the locknut 221 (and also the preload nut 219) can be identical such that a technician can use a single tool and also a single hand to adjust each of them.

As best shown in FIGS. 5E and 5F, the adjustor nut 201 can include an outer surface at a distal end of the shaft 205 that is tapered forming a tapered region 212. Although the outer surface of the tapered region 212 is tapered, the inner diameter of the tapered region 212 can be the same as the inner diameter of the remaining threaded region of the bore 210. The inner threads 215 of the adjustor nut 201 extending through at least a portion of the bore 210 can also extend through the tapered region 212. The tapered region 212 of the adjustor nut 201 can include one or more slits 213 extending through the wall of the shaft 205. The length of the slits 213 and the number of slits 213 can vary. In some implementations, the adjustor nut 201 can include 1, 2, 3, or more pairs of slits 213 equally spaced around the wall of the shaft 205. In some implementations, one or more of the slits 213 can extend from the distal-most end of the shaft 205 to a point proximal of the tapered region 212 (see FIG. 5E). Alternatively, one or more of the slits 213 can extend only within the tapered region 212.

Upon rotation and advancement of the locknut 221 along the shaft 205 toward the proximal end region of the shaft 205, the inner threads 224 of the locknut 221 can engage at least a portion of the threads of the external fastening mechanism 225 of the elongate shaft 205. As the locknut 221 further engages the threads of the external fastening mechanism 225 and advanced toward the tool interface 220 near the proximal end of the adjustor nut 201, the shoulder 222 within the central bore 223 of the locknut 221 wedges against the tapered region 212 of the shaft 205. The one or more slits 213 of the tapered region 212 can be urged towards one another such that the slits 213 narrow and the inner diameter of the tapered region 212 is reduced. This reduction in the inner diameter of the shaft 205 can lock the adjustor nut 201 onto the second region 14 of the coupler 17 threaded through the bore 210 of the adjustor nut 201. This locking relationship can fix the adjustor nut 201 relative to the coupler 17 such that the azimuth adjustment remains fixed.

Some mounting hardware, for example the couplers or eye bolts, can be made of galvanized steel. Galvanized steel threads can be characterized by surface irregularities and, depending on how long the steel parts are submerged in the molten zinc, the amount of material deposited can vary result in a "slop" fit. The tapered region 212 of the adjustor nut 201 can provide a better fit between the inner threads 215 of the adjustor nut 201 and the threads 16 of the coupler 17 thereby remove the "slop" of such threads and improve precise adjustments with better resolution. The locknut can clamp onto the thread to inhibit further rotation of the adjustor nut and also force opposing faces of the contacted threads to contact the adjustor simultaneously, removing any slop present due to oversizing of the mating threads. Applying sufficient torque to the locknut can effect clamping forces greater than might be applicable to the adjustor by external forces. Prior to achieving the best alignment, the various manufacturing tolerances of the mating threads may present undesirable slop in the adjustment. Applying torque to the locknut sufficient to remove the slop, but not sufficient to prevent adjustment by the user, can allow for the ability to use low tolerance manufactured threads to perform with acceptable precision and repeatability. The preload nut can apply a preload between the adjustor and the pole mount. This technique can apply a preload to the threads themselves.

The adjustors described herein can be used to adjust the azimuth, elevation, polarization, or any other type of adjustment of a device, such as an antenna, mounted on a supporting structure after tension is applied between a portion of the adjustor and the mounting element. It should be appreciated that adjustment can be provided by a single adjustor coupled to a region of the mounting element. However, more than one adjustor can be incorporated into the mounting element and used for a variety of adjustments. Further, it should be appreciated that the configuration of the mounting elements described herein can vary and that the adjustors described herein can be used with any of a variety of mounting elements. The mounting elements are described to show as an example the adjustment that can be achieved by the adjustors described herein and are not intended to be limiting. Further, the adjustors described herein need not be directly coupled to a mounting element.

The adjustors described herein can be formed of any number of materials or combination of materials. In some implementations, the adjustors are formed of brass. Brass can provide some lubricity such that additional materials or treatments are unnecessary. The adjustors described herein can also be formed of aluminum, stainless steel, or other relevant materials used in the manufacture of hardware fasteners.

It should be appreciated that the relative configuration of the adjustors described herein can vary. For example, the tool interface need not be positioned only on a proximal end of the adjustor nut and the external fastening mechanism need not be positioned only on a distal end of the adjustor nut. For example, the tool interface can be positioned on the distal end of the adjustor nut and the external fastening mechanism can be positioned on the proximal end of the adjustor nut. Use of the terms "distal" and "proximal" are not intended to be limiting. Further, it should be appreciated that the tool interface need not be an integral part of the adjustor nut. For example, the tool interface can be a separate piece temporarily or permanently affixed during alignment or assembly of the mounting element. The adjustors described herein can have an end that serves a dual purpose. For example, the proximal end of the adjustor can serve as the tool interface for adjustment as well as the fixed end of the preload function. However, the adjustor need not satisfy both of these functions. For example, an end of the adjustor that serves as the fixed end of the preloading function does not need to be the same as the tool interface, either of shape or location. The arrangement of the adjustor can be reversed, for example, such that the fixed end of the preloading function is on the opposite side of the pole mount. Further, the preload nut (or equivalent feature) can serve as the tool interface, or a separate feature altogether can serve as the tool interface.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Although some of the examples disclosed herein refer to making adjusting to azimuths, the mechanisms described herein may adjust other orientations as well. Moreover, the mechanisms described herein may be used with EHF as well as other frequency ranges.

Use of the term "based on," above and in the claims is intended to mean, "based at least in part on," such that an unrecited feature or element is also permissible.

What is claimed:
1. An adjustor configured to position an antenna, the adjustor comprising:
   an adjustor nut comprising:
      a bore extending along a longitudinal axis of the adjustor nut from a distal end region to a proximal end region of the adjustor nut, at least a portion of the bore having inner threads;

a tool interface positioned near the proximal end region of the adjustor nut; and an external fastening mechanism positioned near the distal end region of the adjustor nut, wherein the external fastening mechanism comprises an external thread;

a preload nut configured to engage the external fastening mechanism; and one or more washers, spacers, cushions, bushings, bearings, springs or combinations thereof, wherein, when in use, the preload nut is configured to engage the external fastening mechanism of the adjustor nut and to be positioned at a first location a distance away from the tool interface, wherein, when in use, the adjustor nut is configured to be rotated bi-directionally around the longitudinal axis while the preload nut remains positioned at the first location, wherein a distal-facing surface of the tool interface of the adjustor nut provides a first bearing surface and a proximal-facing surface of the preload nut provides a second bearing surface, and wherein the one or more washers, spacers, cushions, bushings, bearings, springs or combinations thereof is configured to reduce friction between the first bearing surface and the second bearing surface.

2. The adjustor of claim 1, wherein the at least a portion of the bore having inner threads is near the distal end region of the adjustor nut.

3. The adjustor of claim 1, wherein the at least a portion of the bore having inner threads is located between the distal end region and the proximal end region of the adjustor nut.

4. The adjustor of claim 1, wherein the external fastening mechanism comprises a fixation ring, pop rivet, weld, bond, interference fit, thread or combination thereof.

5. The adjustor of claim 1, wherein the preload nut comprises a central bore having an inner thread configured to engage the external thread of the external fastening mechanism.

6. The adjustor of claim 5, wherein rotation of the preload nut provides engagement between the inner thread and the external thread to advance the preload nut towards the proximal end region of the adjustor nut to the first location.

7. The adjustor of claim 1, wherein rotation of the tool interface rotates the adjustor nut.

8. The adjustor of claim 1, wherein the tool interface is integral with and forms an integral portion of the adjustor nut.

9. The adjustor of claim 1, wherein the preload nut comprises an external geometry forming a tool interface, wherein the external geometry of the preload nut corresponds to an external geometry of the tool interface of the adjustor nut.

10. The adjustor of claim 9, wherein the tool interface of the adjustor nut is a hex head.

11. The adjustor of claim 1, further comprising an elongate coupler sized and shaped to insert within the bore of the adjustor nut, the elongate coupler comprising corresponding threads configured to engage the inner threads of the bore.

12. The adjustor of claim 11, wherein rotation of the adjustor nut around the longitudinal axis is configured to cause movement of the elongate coupler positioned within the bore along the longitudinal axis.

13. The adjustor of claim 12, wherein movement of the elongate coupler along the longitudinal axis is configured to adjust the antenna along an elevation coordinate, an azimuth coordinate, or a polarization.

14. The adjustor of claim 11, further comprising a locknut configured to couple to the elongate coupler.

* * * * *